(12) United States Patent
Lee et al.

(10) Patent No.: US 8,873,001 B2
(45) Date of Patent: Oct. 28, 2014

(54) DISPLAY SUBSTRATE AND DISPLAY DEVICE INCLUDING THE SAME

(75) Inventors: Eun-Guk Lee, Seoul (KR); Woo-Jung Shin, Ansan-si (KR); Sang-Ki Kwak, Asan-si (KR); Dong-Yoon Kim, Seoul (KR)

(73) Assignee: Samsung Display Co., Ltd., Yongin (KR)

( * ) Notice: Subject to any disclaimer, the term of this patent is extended or adjusted under 35 U.S.C. 154(b) by 287 days.

(21) Appl. No.: 13/185,336

(22) Filed: Jul. 18, 2011

(65) Prior Publication Data

US 2012/0033165 A1 Feb. 9, 2012

(30) Foreign Application Priority Data

Aug. 6, 2010 (KR) .................. 10-2010-0075895

(51) Int. Cl.
*G02F 1/1333* (2006.01)
*G02F 1/1339* (2006.01)
*G02F 1/1335* (2006.01)

(52) U.S. Cl.
CPC ...... *G02F 1/133512* (2013.01); *G02F 1/13394* (2013.01); *G02F 2201/40* (2013.01)
USPC .......................................... 349/110; 349/155

(58) Field of Classification Search
CPC .............. G02F 2001/136222; G02F 1/133512
USPC ..................................................... 349/110, 111
See application file for complete search history.

(56) References Cited

U.S. PATENT DOCUMENTS

| | | | |
|---|---|---|---|
| 6,281,960 B1* | 8/2001 | Kishimoto et al. | 349/156 |
| 7,230,662 B2* | 6/2007 | Yi et al. | 349/106 |
| 7,334,929 B2* | 2/2008 | Sato | 362/602 |
| 8,310,628 B2* | 11/2012 | Sakata et al. | 349/106 |
| 2001/0010567 A1* | 8/2001 | Rho et al. | 349/43 |
| 2006/0146243 A1* | 7/2006 | Nakanishi et al. | 349/139 |
| 2007/0171337 A1* | 7/2007 | Kim et al. | 349/110 |
| 2010/0201931 A1* | 8/2010 | Jang et al. | 349/139 |
| 2010/0265439 A1* | 10/2010 | Ishitobi et al. | 349/106 |

FOREIGN PATENT DOCUMENTS

| | | |
|---|---|---|
| JP | 2002-182236 | 6/2002 |
| KR | 10-2007-0062739 | 6/2007 |
| KR | 10-2007-0089352 | 8/2007 |

\* cited by examiner

*Primary Examiner* — Dennis Y Kim
(74) *Attorney, Agent, or Firm* — H.C. Park & Associates, PLC (57) ABSTRACT

A display substrate and a display device are provided. The display substrate includes a substrate having a shielding area and a pixel area, and a black matrix layer disposed in the shielding area of the substrate and having a column spacer and a peripheral portion other than the column spacer, wherein an area of the peripheral portion of the black matrix layer relative to unit pixel area is approximately 11% or less.

23 Claims, 12 Drawing Sheets

DISPLAY SUBSTRATE AND DISPLAY DEVICE INCLUDING THE SAME

CROSS-REFERENCE TO RELATED APPLICATION

This application claims priority from and the benefit of Korean Patent Application No. 10-2010-0075895 filed on Aug. 6, 2010, which is hereby incorporated by reference for all purposes as if fully set forth herein.

BACKGROUND OF THE INVENTION

1. Field of the Invention

Exemplary embodiments of the present invention relate to a display substrate and a method for manufacturing a display device including the display substrate.

2. Description of the Background

Liquid crystal displays has been adopted as one of the most widely used types of flat panel display apparatuses. A liquid crystal display typically includes two panels and a liquid crystal layer interposed between the two panels to display an image.

For example, a conventional display panel may include two display substrates in which a first substrate may include a plurality of pixel electrodes arranged in a matrix type and a plurality of thin-film transistors may be disposed for switching voltages applied to the pixel electrodes, and a second substrate may include a common electrode. The arrangement of liquid crystal molecules of a liquid crystal layer may be controlled according to the voltage applied between the pixel electrodes and the common electrode, thereby displaying an image.

Since a liquid crystal display is not self-emissive, it requires a backlight unit for supplying light to the display panel. The display panel may include a transmission region that transmits the light supplied from the backlight unit to the outside, and a shielding region that preventing the light supplied from the backlight unit from transmitting to the outside. The pixel electrode area corresponding to the transmission region and the other area, for example, the thin film transistor area, corresponding to the shielding region may be disposed.

In order to form the shielding region, a black matrix may be disposed on any one of the two substrates of the display panel.

SUMMARY OF THE INVENTION

These and other needs are addressed by the present invention, in which exemplary embodiments of the present invention provide a display substrate of a display device which can reduce stains generated in a liquid crystal dispensing process (to be referred to as dispensing stains) while forming a black matrix layer and a color spacer at the same time by adjusting an exposure level of a material layer for forming a black matrix.

Additional features of the exemplary embodiments will be set forth in the description which follows, and in part will be apparent from the description, or may be learned by practice of the invention.

Exemplary embodiments of the present invention disclose a display substrate. The display substrate includes a shielding area and a pixel area. And a black matrix layer disposed in the shielding area of the substrate. The black matrix layer includes a column spacer and a peripheral portion other than the column spacer. An area of the peripheral portion of the black matrix layer relative to unit pixel area is approximately 11% or less.

Exemplary embodiments of the present invention disclose a display device in which a first substrate, a second substrate facing the first substrate and a liquid crystal layer is interposed between the first substrate and the second substrate. The display includes a shielding area and a pixel area which are defined on the first substrate and the second substrate, respectively, and the first substrate and the second substrate are disposed corresponding to each other. The display further includes a black matrix layer which is disposed in one of the shielding area of the first substrate or the shielding area of the second substrate. The black matrix layer includes a column spacer and a peripheral portion other than the column spacer. An area of the peripheral portion of the black matrix layer relative to unit pixel area is approximately 11% or less.

Exemplary embodiments of the present invention disclose a method. The method includes defining a shielding area and a pixel area on a substrate of a display device, wherein a black matrix layer disposed in the shielding area includes a column spacer and a peripheral area other than the column spacer. The method also includes adjusting the peripheral area to be approximately 11% or less of the area of a unit pixel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It is understood that when an element or layer is referred to as being "on" "coupled" or "connected to" another element or layer, it can be directly on or directly connected to the other element or layer, or intervening elements or layers may be present. In contrast, when an element is referred to as being "directly on" "directly coupled" or "directly connected to" another element or layer, there are no intervening elements or layers present.

It is understood that spatially relative terms, such as "below," "beneath," "lower," "above," "upper," and the like, may be used herein for ease of description to merely describe one element or feature's relationship to another element(s) or feature(s) as illustrated in the figures. Therefore, the spatially relative terms are intended to encompass different orientations of the device in use or operation in addition to the orientation depicted in the figures.

Certain terminology used herein is merely for the purpose of describing exemplary embodiments only and is not intended to be limiting of a scope of the present invention. For example, as used herein, the singular forms "a," "an" and "the" may be intended to include the plural forms as well, unless the context clearly indicates otherwise. It is further understood that the terms "comprises" and/or "comprising," when used, may specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It is further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, display substrates according to exemplary embodiments of the present invention and display devices including the same will be described in detail with reference to the accompanying drawings.

Figure 1:
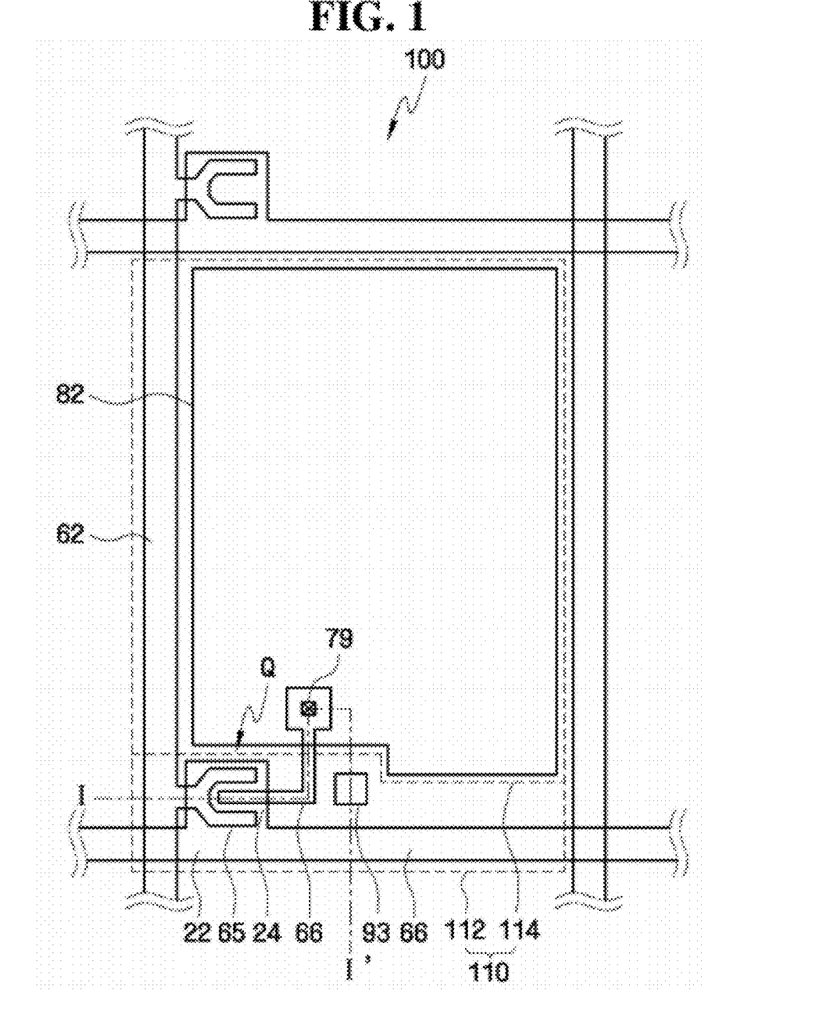
FIG. 1 is a plan view of a display substrate according to exemplary embodiments of the present invention.
Figure 2:
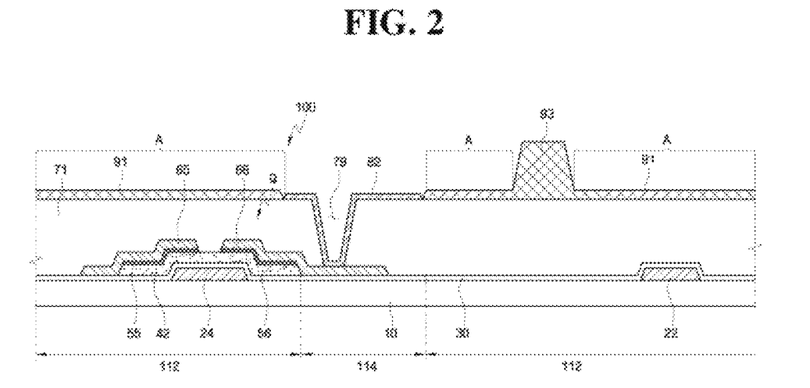
FIG. 2 is a cross-sectional view of the display substrate of FIG. 1 taken along the line I-I'.

A display substrate according to exemplary embodiments of the present invention is described with reference to FIG. 1 and FIG. 2. FIG. 1 is a plan view of a display substrate according to exemplary embodiments of the present invention, and FIG. 2 is a cross-sectional view of the display substrate of FIG. 1 taken along the line I-I'. The display substrate according to the illustrated exemplary embodiments of the present invention may have two display panels in which pixel electrodes and thin film transistors may be formed thereon.

Referring to FIG. 1 and FIG. 2, the display substrate 100 may include a thin film transistor Q disposed on an insulating substrate 10 and having a gate electrode 24, source electrode 65 and drain electrode 66, a semiconductor layer 42, and a pixel electrode 82 switched by the thin film transistor Q.

For example, the insulating substrate 10 may be a glass substrate made of soda lime glass or borosilicate glass, or a plastic substrate, and may have a pixel portion 110 defined therein including a unit pixel and a thin film transistor connected to the unit pixel. Although only a single pixel portion 110 is illustrated in FIG. 1, aspects of the present invention are not limited thereto. A plurality of pixel portions 110 may be arranged in a matrix type and defined in the substrate 10.

The pixel portion 110 may include a shielding area 112 and a pixel area 114. In the shielding area 112, the light supplied from a backlight unit (not shown) disposed under the display substrate 100 is prevented from being transmitted to the outside of the display substrate 100. In the pixel area 114, the light supplied from the backlight unit can be transmitted to the outside of the display substrate 100. As an example, the thin film transistor Q and the pixel electrode 82 included in the display substrate 100 may be disposed in the shielding area 112 and the pixel area 114, respectively.

A gate wiring 22 and 24 that transmits gate signals may be formed on an insulating substrate 10. The gate wiring 22 and 24 includes a gate line 22 that extends in a first direction, for example, in a transverse direction, and a gate electrode 24 protruding from the gate line 22. The gate electrode 24 may constitute three terminals of the thin film transistor Q together with a source electrode 65 and a drain electrode 66, which will later be described.

A storage wiring (not shown) that forms a storage capacitor together with a pixel electrode 82 may also be formed on the insulating substrate 10. The storage wiring, formed with the gate wiring 22 and 24, may be formed in the same level. In this example, the storage wiring and the gate wiring 22, 24 may be disposed on the same layer and made of the same material.

In some examples, the gate wiring 22 and 24 may be made of an aluminum-based metal such as aluminum (Al) and an aluminum alloy, a silver-based metal such as silver (Ag) and a silver alloy, a copper-based metal such as copper (Cu) and a copper alloy, a molybdenum-based metal such as molybdenum (Mo) and a molybdenum alloy, chromium (Cr), titanium (Ti), or tantalum (Ta). For example, the gate wiring 22, 24 may have a multi-layered structure including two conductive layers (not shown) having different physical properties. One of the two conductive layers may be made of a metal having low resistivity, for example, an aluminum-based metal, a silver-based metal, and a copper-based metal, in order to reduce signal delay or voltage drop of the gate wiring 22 and 24. The other conductive layers may be made of a material having good contact characteristics to other materials, particularly to ITO (indium tin oxide) and IZO (indium zinc oxide), such as a molybdenum-based metal, chromium, titanium, and tantalum. According to exemplary embodiments, there are a combination of a lower chromium layer and an upper aluminum layer and a combination of a lower aluminum layer and an upper molybdenum layer. However, illustrated exemplary embodiments provided above are not limited, and the gate wiring 22 and 24 may be made of various metals and conductive materials not explicitly listed herein.

A gate insulating film 30 is formed on the insulating substrate 10 and the gate wiring 22 and 24. The gate insulating film 30 may be made of silicon oxide (SiOx) or silicon nitride (SiNx). The gate insulating film 30 may also be made of aluminum oxide, titanium oxide, tantalum oxide, or zirconium oxide.

The semiconductor layer 42 for forming a channel of the thin film transistor Q is disposed on the gate insulating film 30. The semiconductor layer 42 is disposed to overlap at least the gate electrode 24. The semiconductor layer 42 may be made of amorphous silicon (a-Si) or an oxide semiconductor including one of element selected from gallium (Ga), indium (In), tin (Sn), zinc (Zn), or any combinations thereof.

Ohmic contact layers 55 and 56 are disposed on the semiconductor layer 42. The ohmic contact layers 55 and 56 improve contact characteristics between the source electrode 65 and drain electrode 66 and the semiconductor layer 42, which will later be described. Here, the ohmic contact layers 55 and 56 may be made of an amorphous silicon layer heavily doped with n-type impurity (n+a-Si). If sufficient contact characteristics between the source electrode 65 and drain electrode 66 and the semiconductor layer 42 is obtained, the ohmic contact layers 55 and 56 of the illustrated embodiment may be omitted by way of configurations.

A data wiring 62, 65 and 66 is disposed on the ohmic contact layers 55 and 56, and the gate insulating film 30. The data wiring 62, 65, 66 includes a data line 62 in a direction intersecting the gate line 22, for example, in a longitudinal direction, defining a pixel together with the gate line 22, a source electrode 65 branched from the data line 62 and extending onto the semiconductor layer 42, and a drain electrode 66 spaced apart from the source electrode 65 and formed on the semiconductor layer 42 to face the source electrode 65 in view of the gate electrode 24 or a channel area of the thin film transistor Q. In this example, the drain electrode 66 is formed to extend down to the pixel electrode 82 from the semiconductor layer 42.

A protective film 71 is disposed on the entire surface of the resultant structure having the data wiring 62, 65 and 66. The protective film 71 may have a single-layered structure or multi-layered structure including, for example, silicon oxide, silicon nitride, an organic material having photosensitivity, and/or a low dielectric-constant insulating material such as a-Si:C:O or a-Si:O:F. A contact hole 79 exposing a portion of the drain electrode 66, for example, an end portion of the drain electrode 66 disposed under the pixel electrode 82, is formed in the protective film 71.

The pixel electrode 82 electrically coupled to the drain electrode 66 through the contact hole 79 and is disposed on the protective film 71. The pixel electrode 82 may be made of a transparent conductive material such as ITO (Indium Tin Oxide) or IZO (Indium Zinc Oxide). As described above, the pixel electrode 82 is disposed in the pixel area 114.

In addition, a black matrix layer 91 is disposed on the protective film 71. The black matrix layer 91 is disposed in the shielding area 112 and prevents the light supplied from a backlight unit (not shown) from being transmitted from the shielding area 112 to the outside of the display substrate 100. In addition, the black matrix layer 91 may prevent external light from being directly irradiated into the thin film transistor Q. According to exemplary embodiments, since the black matrix layer 91 is disposed in the shielding area 112, it does not overlap the pixel electrode 82 disposed in the pixel area 114.

The black matrix layer 91 includes a column spacer 93 protruding therefrom. In other words, a portion of the black matrix layer 91, which protrudes compared to the other portions, is to be the column spacer 93. The column spacer 93 maintains a gap between the display substrate 100 and another display substrate (not shown) facing the display substrate 100, thereby facilitating injection of liquid crystal. In the following, for the convenience of explanation, a portion of the black matrix layer 91, which has a smaller thickness than a portion where the column spacer 93 is formed, is referred to as a peripheral portion, labeled 'A' in the drawings.

The black matrix layer 91 including the column spacer 93 may include a negative or positive photoresist and a black pigment.

In addition, the thickness of the peripheral portion A of the black matrix layer 91 is substantially the same as that of the pixel electrode 82 disposed on the protective film 71. Accordingly, except for the portion where the column spacer 93 is formed, there is little step difference between the shielding area 112 and the pixel area 114.

Meanwhile, in order to form the black matrix layer 91 having the protruding portion (that is, the column spacer 93) and the peripheral portion A, a material layer for forming a black matrix is formed on the protective film 71 and an exposure process is then performed using a mask (not shown) having regions in which amounts of light transmitted are different. In this example, the mask used in the exposure process includes an opening area through which light is completely transmitted and a slit area through which a relatively small amount of light is transmitted. The opening area is disposed corresponding to a potential area of the column spacer 93 in the material layer for forming a black matrix, and the slit area is disposed corresponding to an area of the material layer for forming a black matrix, where the column spacer 93 is not to be formed, that is, the peripheral portion A. When the exposure process using the mask is performed, the light passing through the opening area of the mask cures the corresponding material layer for forming a black matrix, and the light passing through the slit area cures the corresponding material layer. In this example, the amount of the material layer cured by the light passing through the slit area is smaller than that of the material layer cured by the light passing through the opening area. Thus, after performing the subsequent developing process, an amount of the remaining material layer corresponding to the opening area is larger than that of the remaining material layer corresponding to the slit area. In this way, the black matrix layer 91 having the relatively protruding portion, that is, the column spacer 93, and the peripheral portion A other than the column spacer 93 is formed.

During the exposure process, contaminant materials (for example, an organic contaminant material due to a photoinitiator contained in photoresist) may be emitted from the material layer for forming a black matrix of the non-transmissive area through which the light is not transmitted, that is, the slit area of the mask. The contaminant materials may cause dispensing stains during a liquid crystal dispensing process.

However, even if the slit area may cause contaminants to the mask, the slit area is inevitable, thus if no slit area exists in the mask, the overall thickness of a black matrix layer increases so that a step difference between the shielding area 112 and the pixel area 114, specifically a step difference between boundary portions of the shielding area 112 and the pixel area 114, may increase, causing texture to edges of the pixel area 114.

Therefore, according to exemplary embodiments of the present invention, it is contemplated that dispensing stains are reduced by reducing an area of the non-transmissive region, that is, the slit area, which is an area of the peripheral portion A in the black matrix layer 91 with respect to an area of a unit pixel to an appropriate level. In this example, the unit pixel area corresponds to an area which is obtained by dividing the display area by a total number of pixels. In some examples, the unit pixel area may substantially be the same with an area of the pixel portion 110. However, unit pixel area may be different from the area of the pixel portion 110. As an example, the term "area" used herein may correspond to an area of a plane without considering a height of a layer, and may be interpreted as a planar area.

In some example, one approach of reducing the area of peripheral portion A in the black matrix layer 91 to an appropriate level is to reduce the overall area of the black matrix layer 91 including the column spacer 93. If the overall area of the black matrix layer 91 is reduced, the area of the peripheral portion A in the black matrix layer 91 is reduced accordingly.

Another approach of reducing the area of peripheral portion A in the black matrix layer 91 to an appropriate level is to increase an area occupied by the column spacer 93 in the black matrix layer 91. If the area occupied by the column spacer 93 in the black matrix layer 91 is increased, the area of the peripheral portion A in the black matrix layer 91 is relatively reduced.

The above mentioned two approaches associated with reducing the area of peripheral portion A may be performed independently or simultaneously. For example, in a state in which the area occupied by the column spacer 93 in the black matrix layer 91 is maintained or increased, the overall area of the black matrix layer 91 may be reduced. Alternatively, in a state in which the overall area of the black matrix layer 91 is maintained or decreased, the area occupied by the column spacer 93 in the black matrix layer 91 may be increased.

Figure 3:
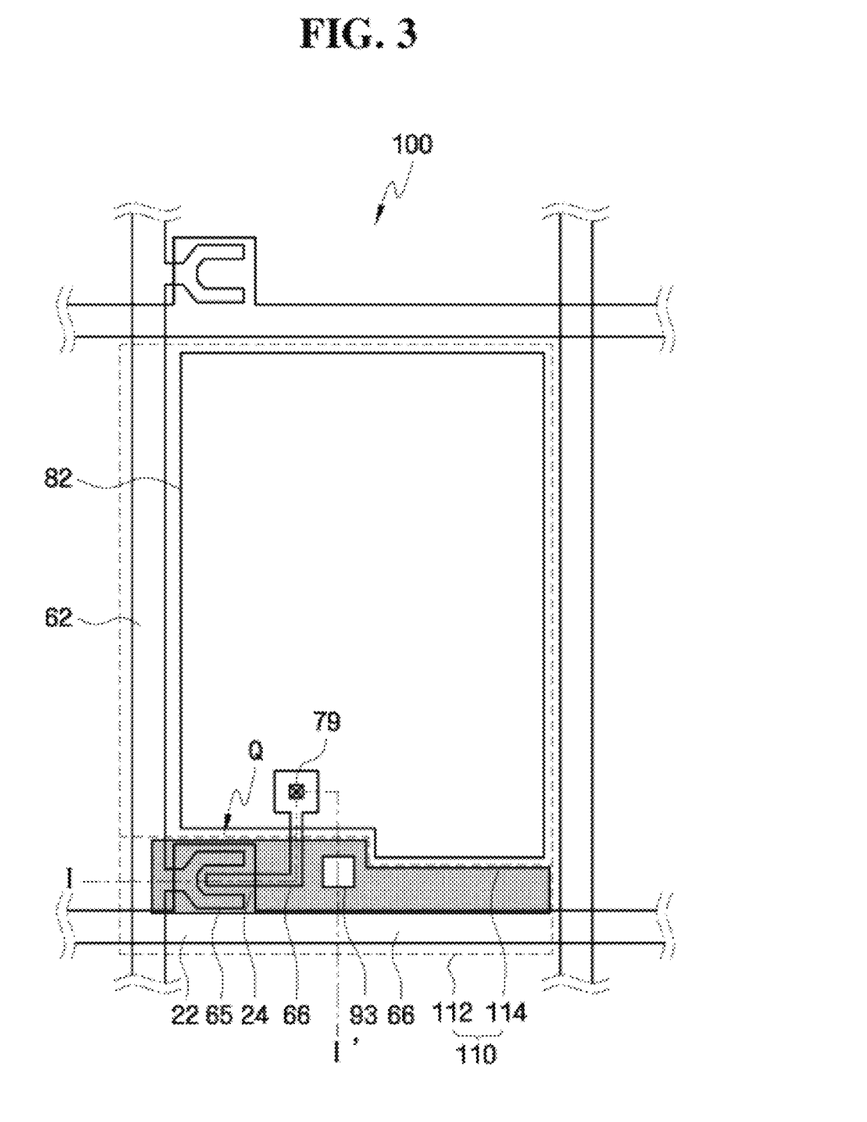
FIG. 3, FIG. 4, FIG. 5 and FIG. 6 illustrate modified embodiments of the display substrate shown in FIGS. 1 and 2.
Figure 4:
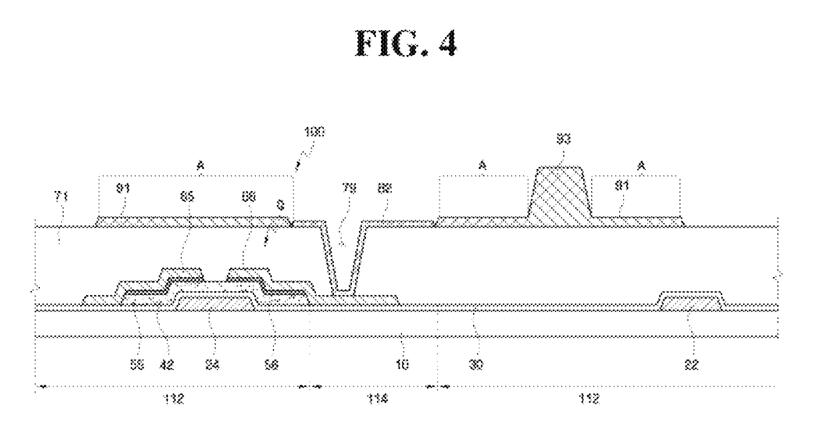
Figure 5:
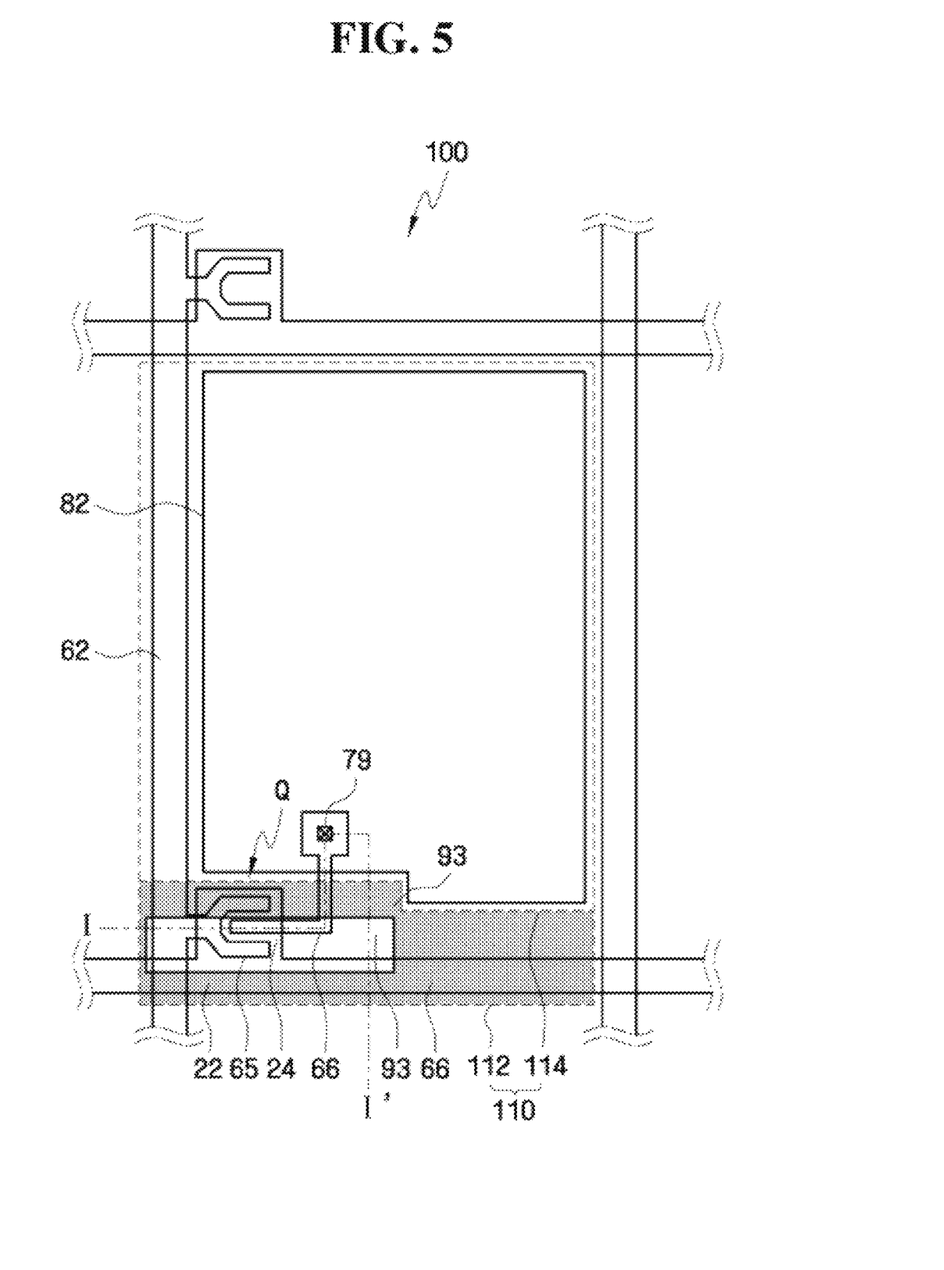
Figure 6:
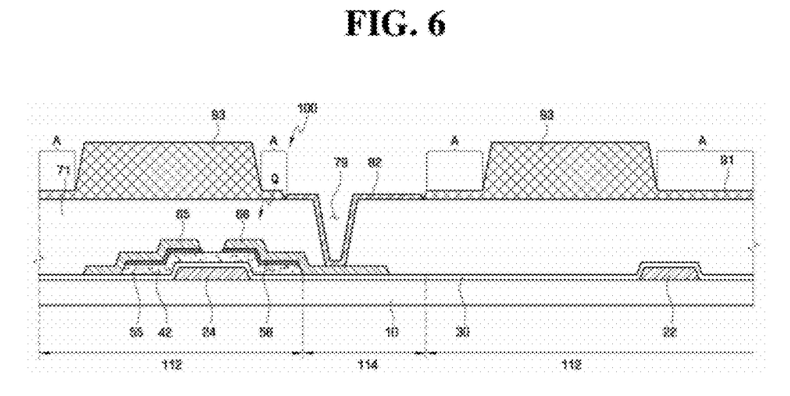

The two approaches associated with reducing the area of the peripheral portion A are described with respect to FIG. 3, FIG. 4, FIG. 5 and FIG. 6. For example, FIG. 3, FIG. 4, FIG. 5 and FIG. 6 illustrate modified embodiments of the display substrate shown in FIGS. 1 and 2. Specifically, FIG. 3 and FIG. 4 illustrate an exemplary embodiment where the overall area of a black matrix layer is reduced, and FIG. 5 and FIG. 6 illustrate another exemplary embodiment where the area occupied by the column spacer 93 is increased.

First, referring to FIG. 3 and FIG. 4, in the exemplarily illustrated embodiment, the black matrix layer 91 including the column spacer 93, as indicated in FIG. 3 by the dark area excluding a portion of the column spacer 93, is formed so as not to cover the entire surface of the shielding area 112, thereby reducing the overall area of the black matrix layer 91 and the peripheral portion A of the black matrix layer 91. In this example, a removable portion to reduce the area of the black matrix layer 91 is a portion excluding the to-be-shielded pattern. In detail, the black matrix layer 91 may be formed so as not to cover at least a portion of the shielding area 112 excluding the to-be-shielded pattern while covering at least the to-be-shielded pattern (for example, the thin film transistor Q). For example, as shown, the black matrix layer 91 may be formed not to cover a portion of data line 62 due to a transversely decreasing width, or not to cover a portion of the gate line 22 due to a longitudinally decreasing width while covering the thin film transistor Q. Although not shown, the black matrix layer 91 may have various shapes as long as the area of the peripheral portion A is capable of covering at least the to-be-shielded pattern.

Referring to FIG. 5 and FIG. 6, in the exemplarily illustrated embodiment, the area of the peripheral portion A in the black matrix layer 91, as indicated in FIG. 5 by the dark area, can be reduced by increasing the area of the column spacer 93. In this example, in order to prevent generation of a step difference between the shielding area 112 and the pixel area 114, specifically a step difference between boundary portions of the shielding area 112 and the pixel area 114, the peripheral portion A of the black matrix layer 91 may be disposed in the vicinity of at least the pixel area 114. Although not shown, the column spacer 93 may have various shapes as long as the area of the peripheral portion A is in an appropriate range.

In the above-described embodiments shown in FIGS. 1 through 6, when the area of the peripheral portion A of the black matrix layer 91 is an appropriate level, the area of the peripheral portion A of the black matrix layer 91 with respect to unit pixel area is about 11% or less. The following relationship is contemplated to satisfy the appropriate level:

$$\text{Area of peripheral portion } A/\text{Unit pixel area} \leq 0.11 \quad [1]$$

As described above, when the area of the peripheral portion A of the black matrix layer 91 with respect to unit pixel area is about 11% or less then dispensing stain levels may be acceptable, as illustrated in FIG. 7A, FIG. 7B, FIG. 7C, FIG. 7D and FIG. 7E.

FIG. 7A FIG. 7B, FIG. 7C, FIG. 7D and FIG. 7E illustrate dispensing stain levels according to an area of a peripheral portion of a black matrix layer.

Figure 7A:
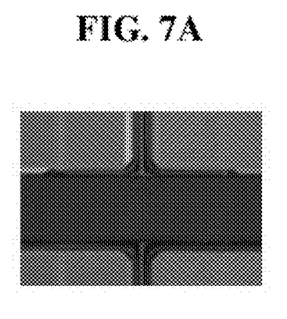
FIG. 7A, FIG. 7B, FIG. 7C, FIG. 7D and FIG. 7E illustrate dispensing stain levels according to an area of a black matrix layer.
Figure 7B:
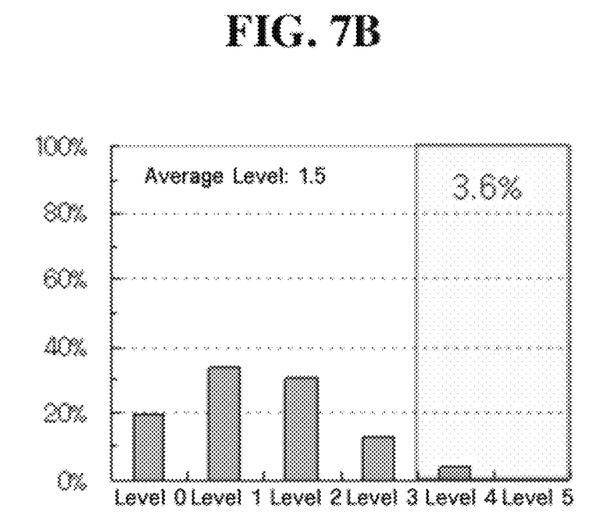

For example, FIG. 7A illustrates that a black matrix layer is formed to cover the entire shielding area in a 46" full high definition (FHD) liquid crystal display (LCD) and an area of a peripheral portion of the black matrix layer relative to unit pixel area is about 14.6%, and FIG. 7B illustrates dispensing stain levels of the black matrix layer of FIG. 7A.

Figure 7C:
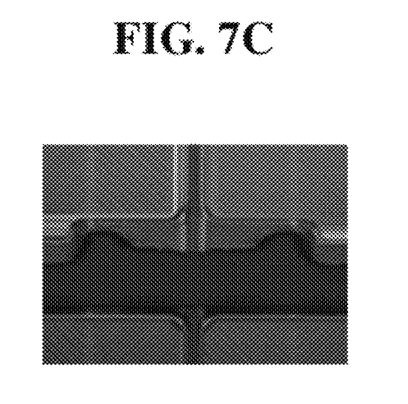
Figure 7D:
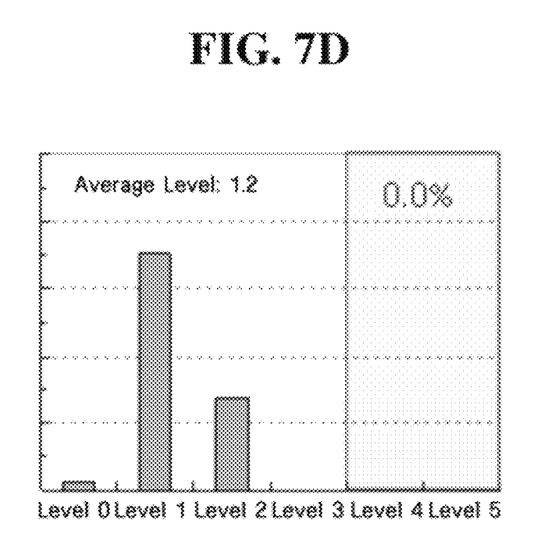

FIG. 7C illustrates that a black matrix layer is formed to expose a portion of a shielding area in a 46" FHD LCD and an area of a peripheral portion of the black matrix layer relative to unit pixel area is reduced to about 10.0% by reducing the overall area of the black matrix layer, and FIG. 7D illustrates dispensing stain levels of the black matrix layer of FIG. 7C.

Referring to FIG. 7B and FIG. 7D, when the area of the peripheral portion of the black matrix layer relative to unit pixel area is reduced to approximately 10.0%, compared to a case when the area of the peripheral portion of the black matrix layer relative to unit pixel area is about 14.6%, the average dispensing stain level is decreasing and quite high dispensing stain levels are not be observed.

Figure 7E:
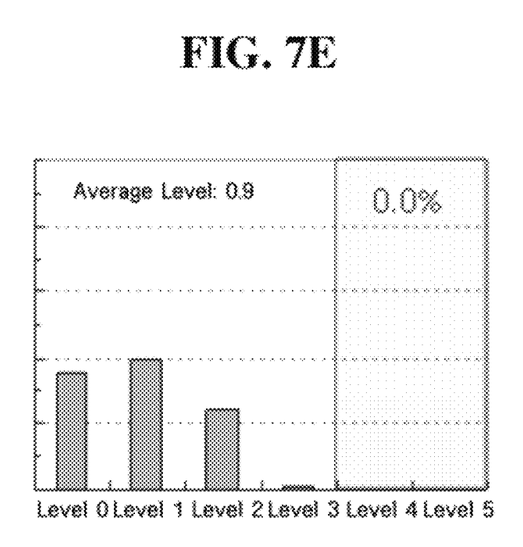

FIG. 7E illustrates dispensing stain levels of a black matrix layer in a 52" FHD LCD when the area of the peripheral portion of the black matrix layer relative to unit pixel area is about 10.9%. In this example, the average dispensing stain level is approximately 0.9, which is relatively low, and similar to the example as shown in FIG. 7D, quite high dispensing stain levels are not be observed.

Figure 8:
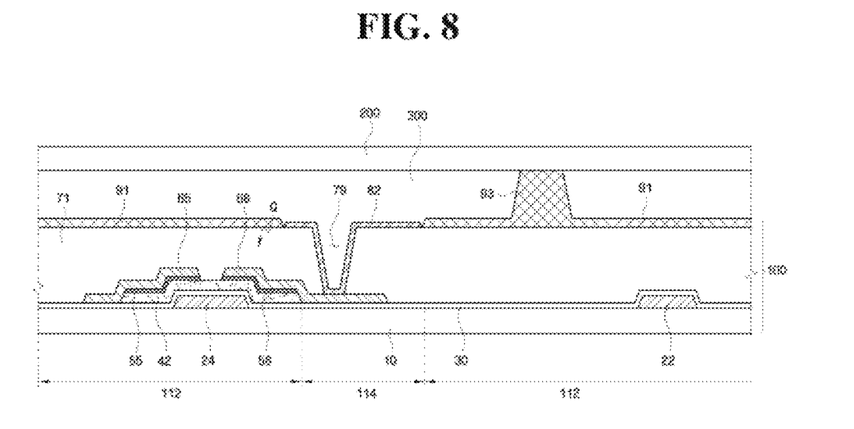
FIG. 8 is a cross-sectional view of a display device according to exemplary embodiments of the present invention.

Hereinafter, a display device according to exemplary embodiments of the present invention is described with reference to FIG. 8. By way of example, FIG. 8 is a cross-sectional view of a display device according to exemplary embodiments of the present invention, illustrating the display device including the display substrates shown in FIG. 1 and FIG. 2. However, instead of the display substrates shown in FIG. 1 and FIG. 2, the display substrates shown in FIG. 3 and FIG. 4 or FIG. 5 and FIG. 6 may also be employed in the display device.

Referring to FIG. 8, the display device, according to exemplary embodiments, is a liquid crystal display device, including the display substrate 100 shown in FIG. 1 and FIG. 2, a second display substrate 200, and a liquid crystal layer 300.

Since the display substrate 100 has already been described above, a detailed description thereof will be omitted to avoid unnecessarily obscuring the present invention. The display substrate 100 of the illustrated embodiment may be the same as the display substrate 100 shown in FIG. 3 and FIG. 4 or FIG. 5 and FIG. 6.

The second display substrate 200 faces the display substrate 100 and includes a common electrode (not shown) facing a pixel electrode. In this example, the common electrode may be made of a transparent conductive material, such as ITO or IZO. In addition, the second display substrate 200 has a shielding area 112 and a pixel area 114 defined in the same manner as in the first display substrate 100.

The liquid crystal layer 300 is interposed between the display substrate 100 and the second display substrate 200, and the transmittance is adjusted according to voltages applied to the pixel electrode 82 of the display substrate 100 and the common electrode of the second display substrate 200. In some examples, the liquid crystal layer 300 may be made of liquid crystal including a reactive mesogen (RM).

Meanwhile, according to exemplary embodiments of the present invention, the black matrix layer 91 including the column spacer 93 is disposed on the display substrate 100 having the pixel electrode 82 and the thin film transistor Q, but aspects of the present invention are not limited thereto.

In some examples, the black matrix layer 91 including the column spacer 93 may be disposed on another display substrate facing a display substrate having a pixel electrode and a thin film transistor (for example, the display substrate 100 of FIG. 8), which is described in more detail with reference to FIG. 9.

Figure 9:
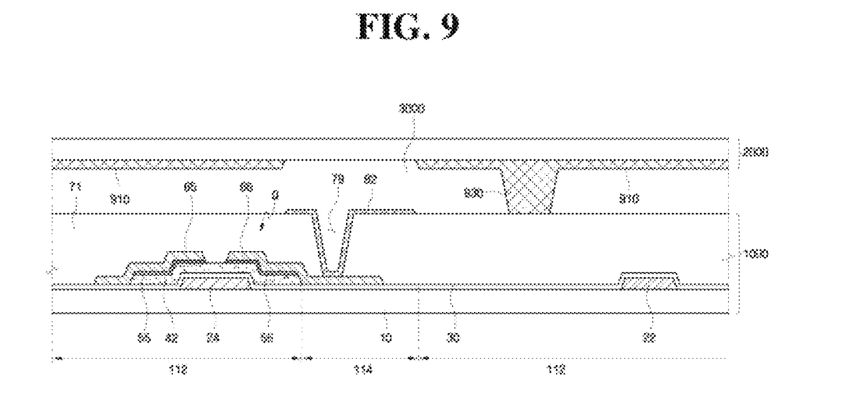
FIG. 9 is a cross-sectional view of a display device according to exemplary embodiments of the present invention.

FIG. 9 is a cross-sectional view of a display device according to another exemplary embodiment of the present invention.

Referring to FIG. 9, the display device, according to exemplary embodiments of the present invention, is a liquid crystal display device, which includes a first display substrate 1000, a second display substrate 2000, and a liquid crystal layer 3000.

In this example, the first display substrate 1000 is substantially the same as the display substrate 100 shown in FIG. 2, FIG. 4 or FIG. 6, except that it is not provided with the black matrix layer 91 including the column spacer 93.

The second display substrate 2000 has a shielding area 112 and a pixel area 114 defined in the same manner as in the first display substrate 100. The second display substrate 2000 has a black matrix layer 910 formed thereon, the black matrix layer 910 including a column spacer 930. In this example, the black matrix layer 910 including the column spacer 930 is substantially the same as the black matrix layer 91 including the column spacer 93 of the previous embodiments, except that it is formed on the second display substrate 2000. That is to say, the column spacer 930 and the black matrix layer 910 including the same may be disposed to face the column spacer 93 and the black matrix layer 91 including the same formed on the is display substrate 100 shown in FIG. 2. Although not shown, the column spacer 930 and the black matrix layer 910 including the same may also be disposed to face the column spacer 93 and the black matrix layer 91 including the same formed on the display substrate 100 shown in FIG. 4. In addition, the column spacer 930 and the black matrix layer 910 including the same may also be disposed to face the column spacer 93 and the black matrix layer 91 including the same formed on the display substrate 100 shown in FIG. 6. Therefore, the column spacer 930 and the black matrix layer 910 including the same are disposed on the second display substrate 2000, the area of the peripheral portion of the black matrix layer 910 relative to unit pixel area can also be reduced to about 11% or less, like in a case where the column spacer 93 and the black matrix layer 91 including the same are disposed on the first display substrate 100.

Meanwhile, although an exemplary embodiment where one thin film transistor Q is disposed in the shielding area 112 and one pixel electrode 82 is disposed in the pixel area 114, aspects of the present invention are not limited thereto.

Although not shown, two or more thin film transistors or other patterns required for pixel control may be disposed in the shielding area 112 and two or more sub-pixel electrodes for applying different voltages may be disposed in the pixel area 114. In this example, if thin film transistors or other patterns required for pixel control are to-be-shielded patterns, the black matrix layer 91 of the shielding area 112 is formed so as not to cover at least a portion of the shielding area 112 while covering at least the to-be-shielded patterns, thereby reducing the area of the peripheral portion A of the black matrix layer 91 relative to unit pixel area. In addition, the area of the peripheral portion A of the black matrix layer 91 relative to unit pixel area can be reduced by increasing the area of the column spacer 930 of the black matrix layer 91, irrespective of the pattern disposed in the shielding area 112 or the structure of pixel electrode disposed in the pixel area 114.

In addition, the shape of pixel electrode disposed in the pixel area 114 (for example, the pixel electrode 82 of FIG. 1) may also be modified in various manners.

Figure 10:
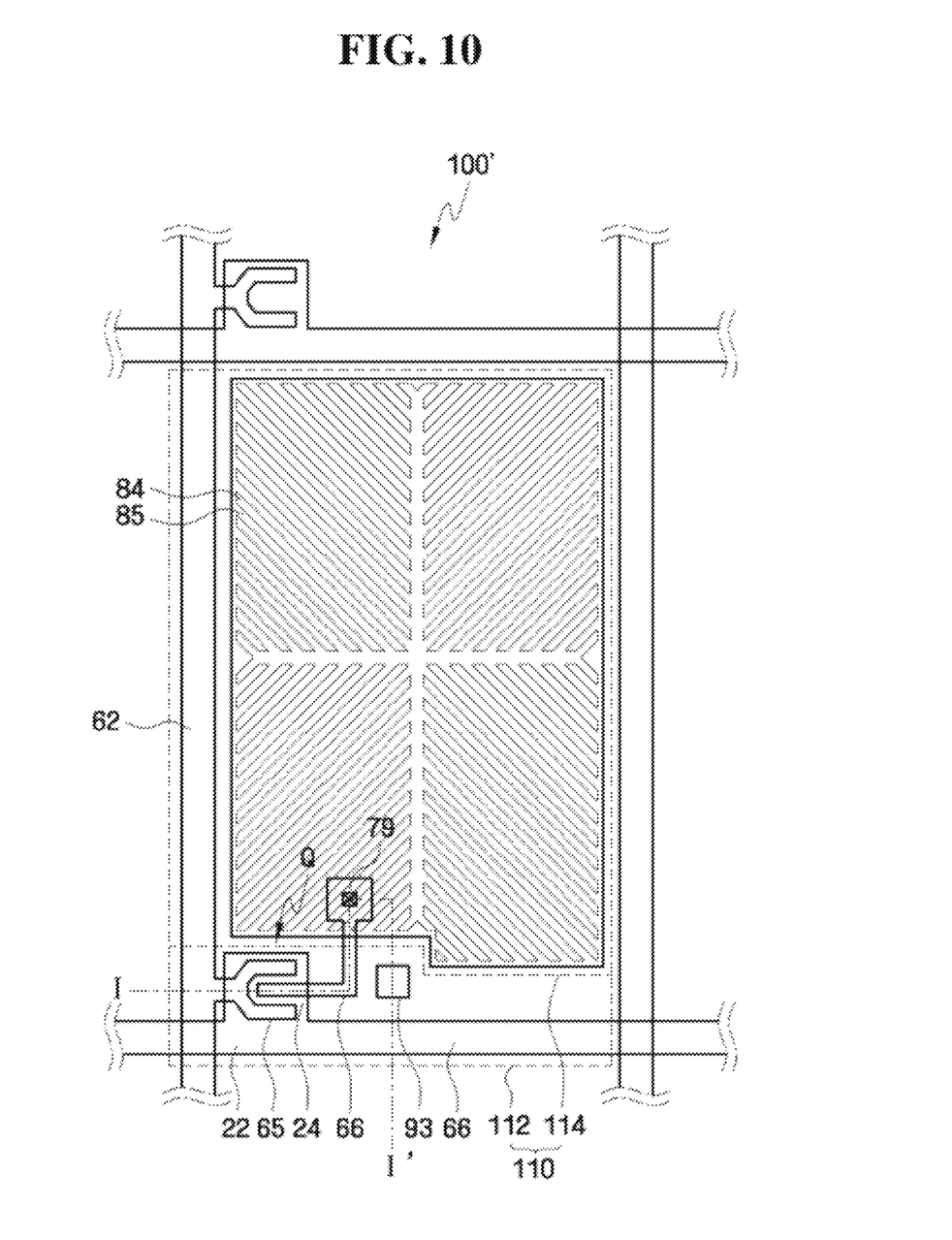
FIG. 10 is a plan view of a display substrate according to exemplary embodiments of the present invention.

In some examples, as shown in FIG. 10, a display substrate 100' has substantially the same configuration as the display substrate 100 shown in FIG. 1, except that pixel electrodes 84 and 85, which include a plurality of microelectrodes 84 obliquely formed toward outer boundaries of a pixel area 114, and a plurality of microslits 85 disposed between each of the microelectrodes 84.

Figure 11:
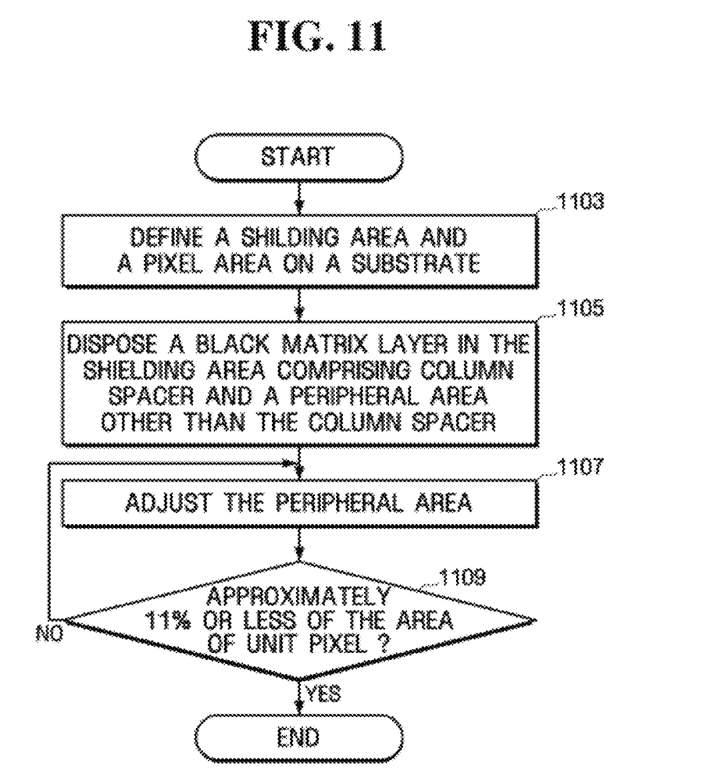
FIG. 11 is a flowchart of a process for providing a display substrate capable of reducing stains during a dispensing process according to exemplary embodiments of the present invention.

FIG. 11 is a flowchart of a process for providing a display substrate capable of reducing stains during a dispensing process according to exemplary embodiments of the present invention. In step 1103, a substrate 100 is disposed in which a shielding area 112 and a pixel area 110 are defined respectively on the substrate 100. In step 1105, a black matrix layer 91 is disposed in the shielding area 112 which comprises a column spacer 93 and a peripheral area other than the column spacer 93. Next, in step 1107, adjust the peripheral area according to the area of the peripheral area of the black matrix layer 91 relative to unit pixel area to approximately 11% or less, per step 1109. It is contemplated that the adjustment can be achieved one of reducing a portion of the black matrix layer 91, increasing a portion of the column spacer 93, or any combinations thereof.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A display substrate comprising:
a substrate comprising a shielding area and a pixel area;
a black matrix layer disposed in the shielding area of the substrate, the black matrix layer comprising a column spacer and a peripheral portion other than the column spacer; and
a pixel electrode disposed in the pixel area of the substrate;
wherein an area of the peripheral portion of the black matrix layer corresponding to a unit pixel area is approximately 11% or less,
wherein the column spacer and the peripheral portion are in contact with each other, and
wherein the black matrix layer does not overlap the pixel electrode disposed in the pixel area.

2. The display substrate of claim 1, wherein the area of the peripheral portion of the black matrix layer corresponding to the unit pixel area is adjusted by reducing an area of the black matrix layer.

3. The display substrate of claim 1, wherein the area of the peripheral portion of the black matrix layer corresponding to the unit pixel area is adjusted by increasing an area of the column spacer.

4. The display substrate of claim 1, further comprising:
a pattern disposed in the shielding area of the substrate; and
an insulating layer disposed on the pattern and the substrate,
wherein the pixel electrode and the black matrix layer are disposed on the insulating layer.

5. The display substrate of claim 4, wherein the black matrix layer covers at least the pattern and wherein at least a portion of the shielding area other than the pattern is not covered by the black matrix layer.

6. The display substrate of claim 4, wherein the pattern comprises a thin film transistor that is coupled to the pixel electrode.

7. The display substrate of claim 1, wherein the peripheral portion of the black matrix layer is disposed in the vicinity of the pixel area.

8. The display substrate of claim 1, wherein the pixel electrode comprises a plurality of microelectrodes protruding toward outer boundaries of the pixel area, and a plurality of microslits disposed between each of the microelectrodes.

9. The display substrate of claim 1, wherein black matrix layer is formed not to cover a portion of a data line and a portion of a gate line, wherein the data line intersects the gate line.

10. The display substrate of claim 1, wherein an area of the peripheral portion is reduced by increasing an area of the column spacer, wherein a step difference between the shielding area and the pixel area is minimized by disposing the peripheral portion in the vicinity of the pixel area.

11. A display device comprising a first substrate, a second substrate facing the first substrate and a liquid crystal layer interposed between the first substrate and the second substrate, the display device comprising:
a shielding area and a pixel area being defined on the first substrate and the second substrate, respectively and disposed corresponding to each other;
a black matrix layer disposed in one of the shielding area of the first substrate or the shielding area of the second substrate, the black matrix layer comprising a column spacer and a peripheral portion other than the column spacer, and
a pixel electrode disposed in the pixel area of the first substrate,
wherein an area of the peripheral portion of the black matrix layer corresponding to a unit pixel area is approximately 11% or less,
wherein the column spacer and the peripheral portion are in contact with each other, and
wherein the black matrix layer does not overlap the pixel electrode disposed in the pixel area.

12. The display device of claim 11, wherein the area of the peripheral portion of the black matrix layer corresponding to the unit pixel area is adjusted by reducing an area of the black matrix layer.

13. The display device of claim 11, wherein the area of the peripheral portion of the black matrix layer corresponding to the unit pixel area is adjusted by increasing an area of the column spacer.

14. The display device of claim 11, further comprising:
a pattern disposed in the shielding area of the first substrate; and
an insulating layer formed on the pattern and the first substrate,
wherein the pixel electrode and the black matrix layer are formed on the insulating layer.

15. The display device of claim 14, wherein the black matrix layer covers at least the pattern and wherein at least a portion of the shielding area other than the pattern is not covered by the black matrix layer.

16. The display device of claim 14, wherein the pattern comprises a thin film transistor that is coupled to the pixel electrode.

17. The display device of claim 11, wherein the peripheral portion of the black matrix layer is disposed in the vicinity of the pixel area.

18. The display device of claim 11, wherein the pixel electrode comprises a plurality of microelectrodes protruding toward the outer boundary of the pixel area, and a plurality of microslits disposed between each of the microelectrodes.

19. The display device of claim 11, wherein the liquid crystal layer is made of liquid crystal comprising a reactive mesogen (RM).

20. The display device of claim of 11, wherein a thickness of the black matrix layer is substantially the same as a thickness of the pixel electrode disposed corresponding to the pixel area.

21. A method comprising:
defining a shielding area and a pixel area on a substrate of a display device, wherein a black matrix layer disposed in the shielding area comprises a column spacer and a peripheral area other than the column spacer, and wherein a pixel electrode is disposed in the pixel area of the substrate; and
adjusting the peripheral area of the black matrix layer to be approximately 11% or less of the area of a unit pixel,
wherein the black matrix layer does not overlap the pixel electrode disposed in the pixel area.

22. The method of claim 21, wherein adjusting comprises one of reducing an area of the black matrix layer, increasing an area of the column spacer, or a combination thereof.

23. The method of claim 22, wherein the substrate comprises a first substrate and a second substrate, wherein the first substrate is disposed facing the second substrate.

\* \* \* \* \*